Feb. 10, 1970  G. SIMMON  3,494,071

PLANT TIES

Filed March 24, 1967

Inventor:
GERHARD SIMMON
BY
DEZSOE STEINHERZ

United States Patent Office 3,494,071
Patented Feb. 10, 1970

3,494,071
PLANT TIES
Gerhard Simmon, 52, Waitzstrasse 18,
Hamburg 2, Germany
Filed Mar. 24, 1967, Ser. No. 625,766
Claims priority, application Germany, Mar. 31, 1966,
S 102,971
Int. Cl. A01g *17/08*
U.S. Cl. 47—44  6 Claims

ABSTRACT OF THE DISCLOSURE

A plant tie is formed of a yoke of strip material bent to an O-shape or figure-of-eight shape having a narrow end at which the ends of the yoke cross. The crossing ends lie at an angle to a centre line through the tie less than the angle of friction so that pressure of a plant stem against the crossed ends from the outside of the tie will resiliently open the tie but similar pressure from inside the tie will lock the ends in closed position. Supports for the ends may be provided on the inside of the yoke.

Figure 1:
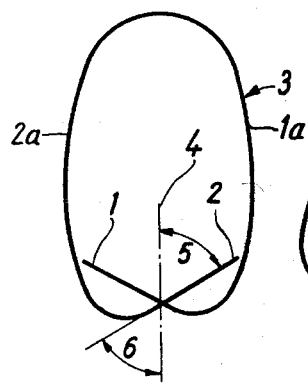

This invention relates to a plant tie for fixing plants to supporting rods, wires or the like, consisting of an O-shaped or figure-of-eight shaped yoke, whose ends, which can be resiliently spread out for the insertion of the plant or wire, cross over one another inwardly on each side of the O-shape or 8-shape.

Such ties are known of oval shape, in which the opening lies at a wide side. Here the tensile stresses to be absorbed by the tie between the parts to be connected tend to bend up the tie. Oval ties are also known in which the opening lies at a narrow side. Here again the forces which will act on the tie exert an opening action, which must be compensated by a correspondingly larger spring force. As however the spring force is necessarily restricted, because of cost considerations and for convenience in handling, these ties are unsafe.

Figure-of-eight ties assembled from two clamping ovals are also known, which grip by one clamping oval a holding element, for instance a peg or wire, under tension. They have the disadvantage of being under tension when fixed, and can become loose when the material is fatigued, while under the action of wind forces, strong enough to overcome the clamp spring force, they can accidentally come undone.

The invention is directed to the removal of these defects and this is effected with a tie of the kind described above, which is particularly characterised in that the opening side of the tie is one of the narrower sides of the O-shape or figure-of-eight shape and that the opening-side boundary of the surface area enclosed by the tie is formed on each side of the centre line by an end coming from the other side, which forms an acute angle with the centre line and on said other side of the centre line lies considerably outside the other end here forming the inner boundary.

The tie in accordance with the invention offers a substantially improved security of grip, as the pressure exerted on the yoke ends by a plant forcing its way outwards, only closes these ends together more strongly, so that any accidental opening is prevented.

Preferably the yoke ends enclose both inside the tie and also on the outside of the tie opening, an angle with the centre line lying below the friction angle. In this way the use of the clamp is considerably facilitated: the holding wire or the plant is simply pressed into the open jaws of the clamp, which opens of its own accord and accommodates the wire or plant.

It has been found advisable to make the clamp figure-of-eight shaped in such a way that one clamping oval is formed for the holding wire and another for the plant. The first clamping oval may be made greater or smaller as is necessitated by the diameter of the holding component (wire, rod, peg or the like).

In fixing, the method preferably adopted is that first of all the clamping oval remote from the opening of the tie, is slipped over the holding wire or rod and then the plant pressed into the opening of the tie. To prevent the wire or rod slipping through the waist of the clamp into the oval provided for the plant meanwhile, it is possible in accordance with a feature of the invention for the angle in the middle zone of closer approach of the two yoke sides, that is to say in the waist, to be made flexible and/or for the clamping oval designed to accommodate the wire or rod to be prestressed in the closure direction. The result of this is that when the tie opens the waist does not also open to the same extent.

To prevent the twisting of the tie, one yoke end can be made forked and holds the other yoke end in its fork opening.

If the tie is subjected to tensile stresses, when for instance the plant, under the force of the wind, tends to move away from the holding wire or rod, and presses from the inner side into the opening angle, the yoke ends may be subjected to considerable stress. In order to save material in spite of this in making the tie, it can be formed in such a way that the yoke ends can be supported under such a stress. Preferably this is effected by the fork opening only extending to the centre line of the tie, and the other yoke end, when the tie is closed or pressed together, abutting against the bottom of the fork opening.

In addition or alternatively the sides of the yoke, where they contact a yoke end when the tie is closed or pressed together, may have support devices for the yoke end.

Such support devices may be formed by the edges of perforations, or each yoke side can be bent inwards to form a step on which the other yoke end rests.

In the simplest form of embodiment the clamp may be bent from wire. Preferably it is made from plastics or stamped metal strip.

Figure 2:
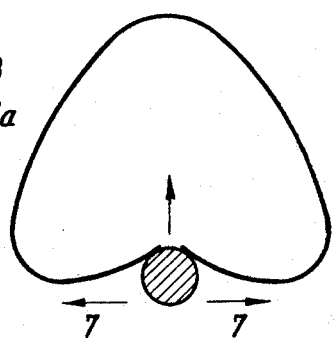
Figure 3:
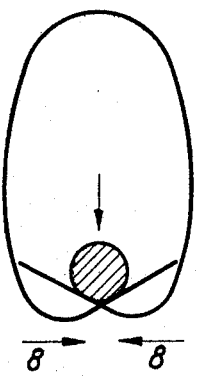
Figure 4:
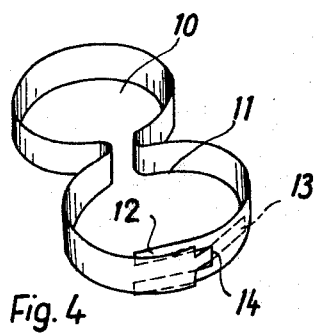
Figure 5:
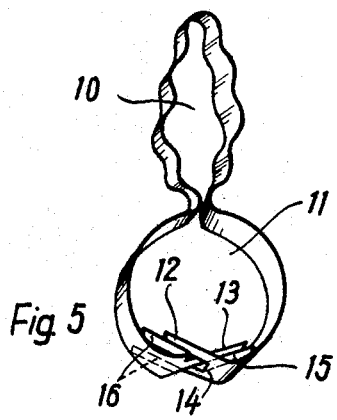
Figure 6:
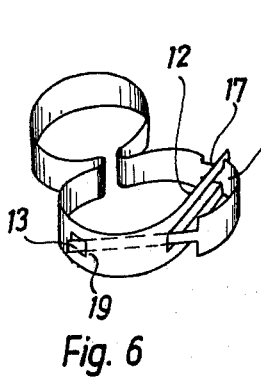
Figure 7:
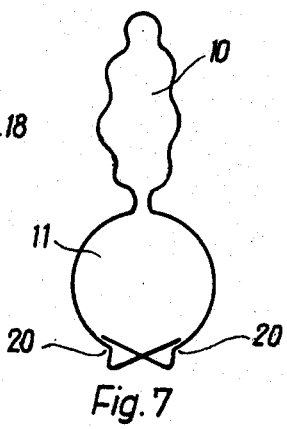
Figure 8:
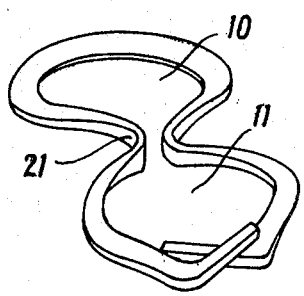

The invention will now be described in more detail by way of example with reference to the accompanying diagrammatic drawing, in which:

FIGURES 1, 2 and 3 show the simplest form of plant tie in the rest condition, during the opening movement and stressed from within respectively, FIGURE 4 shows a clamp with forked yoke end, FIGURES 5, 6 and 7 shows clamps with various support arrangements for the yoke ends, and FIGURE 8 shows a clamp with a different cross-sectional construction at the yoke periphery.

As can be seen in FIGURE 1, the ends or terminal parts 1 and 2 of a yoke which is of elongated O-shape and has relatively long side portions 3, 1*a*, 2*a*, are bent inwards in such a way that they are adjacent in the opening zone to the enclosed surface, and they enclose with a centre line 4, acute angles 5 and 6 both on the inside and also on the outside of the loop formed by the tie. The side portion 1*a* and its terminal part 1 together form one lateral section of the yoke or clamp 3. The other lateral section of the clamp is formed by the side portion 2*a* and its terminal part 2. If as shown in FIGURE 2 a rod or plant stem is pressed from the outside into the opening of the tie, then the tie opens in the direction of the arrow 7, while the angle 6 is smaller than the angle of friction.

However, the yoke ends 1 and 2 are pressed together in the direction of the arrow 8 in FIGURE 3, when such an article is forced outward from the inside of the clamp.

FIGURES 4 to 8 represent figure-of-eight shaped ties in which the waist width should be as small as possible, so that the fixing rod or wire, for which the clamping oval 10 is provided, cannot slip over under the action of some accidental force occurring, into the clamping oval 11 intended for the plant. If the clamp is only intended for one holding wire, the clamping oval 10 can be very small.

In FIGURE 4 the yoke end 12 is forked, has one pair of prongs, and accommodates the other yoke end or central tongue 13, so as to exclude relative movement of the yoke end transversely to the plane of the tie, such as might otherwise arise with twistings of the plant in relation to the holding member.

The yoke end 13 is supported against the bottom 14 of the fork in the event of a stressing in the manner shown in FIGURE 3.

A larger support surface is supplied by the construction shown in FIGURE 5, in which the material 15 stamped out of the fork in the form of an intermediate projection is not removed but is bent bent back inwards from the fork bottom 14. Similarly the material 16, which likewise was not removed from the yoke end 13, is bent inwards in the form of spaced lateral projections aligned with the pair of prongs of yoke end 12 to support the latter.

Other support devices are shown in FIGURE 6 in the form of lateral recesses 17 on the yoke side 18 for the forked yoke end 12 and a central recess 19 on the other yoke side for the single yoke end 13.

In the construction shown in FIGURE 7 the yoke ends are supported on steps 20, which are provided by bending inwardly the yoke sides in the zone of the yoke ends coming from the other side.

To prevent the clamping oval 10 opening accidentally in the waist zone 21 when bending up the tie, the waist of the tie can be made flexible, for instance as shown in FIGURE 8. In the instance shown the cross-sectional dimension of the yoke in the plane of the tie is made small in the waist zone, while on the remaining periphery of the clamping oval 10 it is large. It is also greater in the remaining periphery of the clamping oval 11, in order to increase the resistance strength of the clamp and particularly the yoke ends.

FIGURE 5 shows a corrugated clamping oval 10 for accommodating a holding rod. It is elastically stressed in such a way that the opening of the tie does not simultaneously cause bending apart of the waist; on the contrary, the two halves of the tie are in fact resiliently sprung at the waist. The longitudinally-extending corrugated form of the clamping oval means that this clamping segment—adapted in each case to different diameters of the thickness of the support—can be pressed as tightly as possible against the holding rod, thus avoiding any accidental slipping of the clamp while the clamp can be gripped by the fingers of one hand as free from the possibility of slip as possible. Even in the event of the plant part accidently getting into the clamping oval and the holding support in the support ring, the extensibility of the clamping oval due to the corrugated shape would prevent any accidental nipping off or throttling of the part of the plant getting thicker as it grows.

The side parts of the tie, with the object of improving elasticity and strength, or again for the purpose of saving material, can be made corrugated longitudinally or transverserly or perforated in some suitable manner. This depends to a great extent on the properties of the material used. Further, a flat strip shape prevents the plant part held (similarly as when using bast) from being strangulated.

A plurality of ties can be suspended one from another in a chain for bridging over larger distances.

I claim:
1. A plant tie of flexible material and of elongated contour forming at least one loop for accommodating objects including plant material and a holding element therefor, comprising a pair of relatively long, opposite lateral sections permanently connected with each other at one end of said tie, said lateral sections including a pair of said portions and a pair of terminal parts located on said side portions at the other end of said tie and arranged to cross each other with a predetermined angular relationship and generally in a direction towards the interior of said loop when in a closed position but to be resiliently spread apart for forming an opening in said tie, said angular relationship and the flexibility of said material being such that upon pressure exerted by one of said objects against the outside of the crossed terminal parts the latter will be caused readily to open, each of said terminal parts extending at least substantially to the respective opposite side portion in said closed position so as to securely retain said objects in said loop when accommodated therein, and at least one of said terminal parts being supported on the opposite lateral section in said closed position.

2. A tie as defined in claim 1, including at least one projection integral with one of said terminal parts and bent back inwardly of said loop so as to support the other terminal part.

3. A tie as defined in claim 1, wherein one of said terminal parts is forked and has a pair of spaced prongs and an opening between said prongs adapted to accommodate the other terminal part, and said one terminal part carries an integral projection bent back inwardly of said loop and rearwardly of said opening for supporting the other terminal part in said closed position.

4. A tie as defined in claim 3, wherein said other terminal part comprises a tongue substantially centrally located thereon for insertion between said pair of spaced prongs of the forked terminal part, and has a pair of spaced projections integral therewith and bent back inwardly of said loop at both sides of said tongue in alignment with said pair of spaced prongs of the forked terminal part for supporting the latter in said closed position.

5. A tie as defined in claim 1, wherein at least one of said side portions has recess means therein for receiving and supporting the terminal part of the opposite side portion.

6. A tie as defined in claim 1, wherein at least one of said side portions has a bend therein so as to form a step for supporting the terminal part of the opposite side portion in said closed position.

References Cited

UNITED STATES PATENTS

| 345,407 | 7/1886 | Besse | 24—237 XR |
|---|---|---|---|
| 601,782 | 4/1898 | Speer | 47—43 |
| 870,657 | 11/1907 | Woodworth | 24—237 XR |
| 2,484,449 | 10/1949 | Fetterman | 47—47 XR |

FOREIGN PATENTS

| 323,638 | 1/1930 | Great Britain. |
|---|---|---|
| 714,110 | 8/1954 | Great Britain. |
| 8,009 | 12/1907 | France. |
| 422,176 | 10/1924 | Germany. |

ROBERT E. BAGWILL, Primary Examiner

U.S. Cl. X.R.

24—237; 40—10; 248—49